United States Patent Office 3,689,245
Patented Sept. 5, 1972

3,689,245
ALKALI METAL SILICATE-STABILIZED
PESTICIDE FOAMS
Verne Wesley Weidman and Paul C. Yates, Wilmington, Del., assignors to E. I. du Pont de Nemours and Company, Wilmington, Del.
No Drawing. Continuation-in-part of application Ser. No. 779,275, Nov. 26, 1968. This application Sept. 21, 1970, Ser. No. 74,192
Int. Cl. A01n 9/00, 11/00, 17/06
U.S. Cl. 71—65          5 Claims

ABSTRACT OF THE DISCLOSURE

Agricultural pesticides are precisely and conveniently applied when dispersed or dissolved in an aqeuous alkali metal silicate foam. This pesticide-containing foam is from 5 to 50 percent by weight of an alkali metal silicate or their mixtures, at least 40% by weight water, contains at least 0.5 percent by weight, based on the alkali metal silicate, of a surfactant and has a total volume of from 3 to 300 times the volume of the liquid in the foam. The foam serves as a carrier for a pesticide, the pesticide being from 0.1 to 25 weight percent of the foam.

CROSS-REFERENCE TO RELATED APPLICATION

This application is a continuation-in-part of our copending application, Ser. No. 779,275, filed Nov. 26, 1968, now abandoned.

BACKGROUND OF THE INVENTION

Precise and easy application is important in the use of agricultural pesticides. The term pesticide is used to include those compositions which are effective in killing, preventing, or controlling the growth of plants, insects, nematodes, mites, viruses, algae, microorganisms, fungi, bacteria, and the like.

Commonly used agricultural pesticides are included in the following partial list.

DDT [2,2-bis(p-chlorophenol)-1,1,1-trichloroethane]
2,4-D (2,4-dichlorophenoxyacetic acid)
2,4,5-T (2,4,5-trichlorophenoxyacetic acid)
Dieldrin (1,2,3,4,10,10-hexachloro-6,7-epoxy-1,4,4a,5,6, 7,8,8a-octahydro-1,4-endo, exo-5,8-dimethanonaphthalene)
"Sesone" (sodium, 2,4-dichlorophenoxyethyl sulfate)
Endrin (1,2,3,4,10,10-hexachloro-6,7-epoxy-1,4,4a,5,6,7, 8a-octahydro-1,4-endo, endo-5,8-dimethanonaphthalene)
Heptachlor (1,4,5,6,7,8,8-heptachloro-3a,4,7,7a-tetrahydro-4,7-endo-methanoindene)
Malathion [S-(1,2-dicarbethoxyethyl)o,o-dimethylphosphorodithiodate]
Parathion (O,O-diethyl-O-p-nitrophenylphosphorothioate)
DDVP (O,O-dimethyl-O-2,2-dichlorovinylphosphate)
"Ovex" (p-chlorophenyl, p-chlorobenzenesulfonate)
Lindane (gamma isomer of 1,2,3,4,5,6-hexachlorocyclohexane)
EPN (O-ethyl-O-p-nitrophenyl, phenylphosphonothioate)
"Di-Syston" O,O-diethyl-S-2-(ethylthioethylphosphorodithioate)
"Dacthal" (dimethyl ester of tetrachloroterephthalic acid)
DSMA (disodium salt, methane arsonic acid)
"Simazine" [2-chloro-4,6-bis(ethylamino)-S-triazine]
"Aatrax" (2-chloro-4-ethylamino-6-isopropylamine-S-triazine)
Diuron [3-(3,4-dichlorophenyl)-1,1-dimethylurea]
"Sirmate" (3,4-dichlorobenzyl methyl carbamate)
"Dexon" (p-dimethylaminobenzene diazo sodium sulfonate)
"Bayer 73" (5,2'-dichloro-4'-nitrosalicylanilide, ethanolamine salt)
"Captan" (N-trichloromethyl-1,2,4-thiadiazole)
"Maretin" (N-hydroxynaphthalimide diethylphosphate)
"Daconil" 2787 (tetrachloroisophthalonitrile)
Linuron [3-(3,4-dichlorophenyl)-1-methoxy-1-methylurea]
Prometryene [2-methylmercapto-4,6-bis(isopropylamino)-S-triazine]
"Ramrod" (2-chloro-N-isopropylacetanilide)
Bromacil (5-bromo-3-sec-butyl-6-methyluracil)
"Ammate" (ammonium sulfamate)
Fenuron (3-phenyl-1,1-dimethylurea)
Lenacil (3-cyclohexyl-5,6-trimethyleneuracil)
Methoxychlor [2,2-bis(p-methoxyphenyl)-1,1,1-trichloroethane]
Monuron [3-(p-chlorophenyl)-1,1-dimethylurea]
Neburon [1-m-butyl-3-(3,4-dichlorophenyl)-1-methylurea]
Siduron [1-(2-methylcyclohexyl)-3-phenylurea]
Terbacil (3-tert-butyl-5-chloro-6-methyluracil)
Dimethylamine salt of trichlorobenzoic acid
Diphenamid (N,N-dimethyl-2,2-diphenylacetamide)
"Balan" (N-butyl-N-ethyl-a,a,a-trifluoro-2,6-dinitro-p-toluidine)
Trifluralin (a,a,a-trifluoro-2,6-dinitro-N,N-dipropyl-p-toluidine)
"Lasso" [2,2-chloro-2',6'-diethyl-N-(methoxymethyl) acetanilide]
Benomyl [methyl-1-(butylcarbamoyl)-2-benzimidazolecarbamate]
Chloroneb (1,4-dichloro-2,5-dimethoxybenzene)
Ferbam (ferric dimethyldithiocarbamate)
Maneb (manganese ethylene-bis-dithiocarbamate)
Thiram (tetramethylthiuram disulfide)
Zineb (zinc ethylene-bis-dithiocarbamate)
VPM (sodium methyl dithiocarbamate)
Methyl-2-benzimidazolecarbamate
Phosphonic acid, carbamoyl monoethyl ether, salts Other examples of pesticides may be found in the lists provided in Chemical Week 105, 11, 38–68, Apr. 12, 1969, and Chemical Week 105, 13, 38–68, Apr. 26, 1969, published by McGraw-Hill, Inc., New York, N.Y.

Conventional spray techniques wherein water is used as the carrier of the pesticide generally require the use of large amounts of water to attain uniform distribution. The use of 100 gallons or more of water per acre for the spraying of wettable powders is not uncommon. To haul such large quantities of water is costly and, where many acres are to be treated, much time is consumed merely in recharging the spray tanks. In addition, the weight of the water and the equipment required to haul it in large quantities cause undesirable compaction of the soil being treated.

In order to minimize application costs and speed up the spray application of pesticides, attempts have been made to use less water. Underlying most attempts was the principle that an equal area can be covered by a smaller volume as the spray drop size is reduced. However, this procedure has a serious disadvantage in that as the spray droplet decreases in size, the more readily the water is evaporated. The concentrated pesticide which may then be in the form of a fine particulate solid or a mist of water-insoluble non-volatile liquid, may then be carried by the wind and deposited on an area other than the intended target. Considerable damage is caused to desirable foliage each year by herbicides that have drifted from the point of application in the above described manner. Drift of insecticides or fungicides adds to environmental pollution. Also, the loss of the pesticide by drift results in a more costly operation for the farmer, and the need to apply excessive amounts of pesticide in order to obtain adequate control of the target pest.

The need for improved spray technology has been in evidence by many recent attempts to further modify spray characteristics. One such attempt involves the use of an aqueous foam as a carrier rather than water. The most obvious advantage of a foam carrier over water is that the volume of liquid required for the application of a pesticide can be reduced drastically. Thus the volume of a given amount of liquid can be increased in some instances to as high as about 300 times by foaming. Instead of 100 gallons or more per acre, the required liquid, when applied as a foam, may be only a few gallons or less per acre. The volume of the pesticide-containing medium is greatly increased by dispersing throughout the liquid a large volume of air in the form of bubbles. The increase in volume is expressed as the foam expansion factor, defined as the ratio of the volume of a foam to the volume of the liquid content.

Additional advantages of the foam application of pesticides are reduced drift, high visibility on the target allowing for more accurate placement, excellent adherence to the target surface, and resistance to wash-off. Foam can be applied either as droplets or as a continuous layer.

The use of foams for agricultural purposes and, specifically, as carriers for pesticides, has been described by various investigators: Range Engineering Development Corp., San Angelo, Texas (22d Annual Meeting Southern Weed Science Society, January 1969), and H. J. Braud, Jr., Louisiana State University (Paper No. 69–617, meeting Am. Soc. Ag. Eng., December 1969). These references describe the use of a starch derivative or a proteinaceous substance such as gelatin as the foam stabilizer. In the work of H. J. Braud referred to above, these stabilizers were used to produce foams for frost protection of strawberries. In this application they proved to be quite satisfactory; however, they present certain disadvantages when considered as carriers for agricultural pesticides. The starch-based foam has little or no structural stability above about 50° F. It collapses within minutes after application to foliage above 50° F. and is readily washed off by rain. The rate at which the gelatin foams collapse is also quite temperature-sensitive. They form a tough skin and retain their structure at temperatures below about 50° F., but do not form a skin and collapse readily to a liquid at temperatures normally encountered during the application of pesticides to crops.

The use of gelatin as the foam stabilizer has the added disadvantage that the foaming solution has to be maintained above a certain temperature, depending upon the gelatin concentration, prior to foaming in order to prevent gelling and consequential clogging of the foam generator. The gel point of the 1–2% aqueous solutions used by Braud is near 65° F. It is impractical to impose on the agricultural equipment the additional requirement of controlling the temperature of the pesticide spray solution.

A very recent publication by C. G. McWhorter and W. L. Barrentine in Weed Science, vol. 18, No. 4, July 1970, pp. 500–505, describes a foam applicator capable of creating 300–400 gal. of foam from 1 gal. of water and used for applying herbicides in cotton and soybeans after emergence. A number of surface active agents and foam stabilizers were studied. Equipment of this type can be used to generate the foams of the present invention, which are more stable than the higher volume foams described in this article. In fact, McWhorter and Barrentine state in this article. In fact, McWhorter and Barrentine state "The detrimental effect of dust blowing from the soil surface onto the foam was apparent in our field research. Dust causes damage and rapid destruction of bubbles." "Availability of a stabilizing agent to increase foam persistence could permit this technique to be adopted for commercial usage."

It is an object of this invention to provide a stable aqueous alkali metal silicate foam as a carrier for agricultural pesticides. The alkali metal silicate foams of the present invention collapse very little upon drying, thus maintaining a foam structure that adheres strongly to foliage and which persists much longer than the starch phosphate and gelatin foams when exposed to dust or adverse weather conditions such as wind and rain.

SUMMARY OF THE INVENTION

Agricultural pesticides can be easily and precisely applied using an aqueous alkali metal silicate foam as a carrier. The foam of this invention has a total volume between 3 and 300 times the volume of liquid in the foam. The foam comprises from 0.1 to 25 percent by weight of pesticide, at least 40% by weight water, 5 to 50 percent by weight of an alkali metal silicate or their mixtures having a silica to alkali metal oxide mole ratio from about 1:8 to 20:1 and at least 0.5 percent by weight of the alkali metal silicate present of a surfactant. Sodium silicate with a silica to sodium oxide ratio of from 1.9:1 to 3.5:1 is the preferred foam stabilizer.

Optionally, additional foam stabilizers can be added, such as sodium methyl siliconate in the amount of from 0 to 10% by weight of sodium silicate or xanthan gum, a high molecular linear polysaccharide, in the amount of from 0 to 1.5% by weight of the total water present.

This foam's advantages as a pesticide carrier are low liquid volume, accurate placement, reduced drift, visibility on the target, good adherence, resistance to wash-off and greater physical stability compared to coarse bubble surfactant foams. The foam can be applied either as droplets or as a continuous layer, as in a band treatment. A further advantage of the alkali metal silicate foams is that they can bring about more rapid action in the case of some pesticides. This may be due to the alkalinity of the medium which facilitates penetration of the hydrophobic surfaces of many plants and insects and to the foam stability which retains the pesticide in a moist atmosphere on the surface of the leaf.

DESCRIPTION OF THE PREFERRED EMBODIMENTS

The compositions of this invention consist essentially of water, an alkali metal silicate or mixtures of such silicates, a cationic, anionic or nonionic surfactant, and a pesticide. Optionally, sodium methyl siliconate or a xanthan gum can be added to give an increased measure of stability to the foam, in cases where this is desired.

The alkali metal silicates suitable for stabilizing the pesticide foams of the invention are the silicates of lithium, sodium and potassium, or their mixtures. The alkali metal silicate content of the foams is from 5 to 50% by weight.

Below about 5 percent by weight the foam is not of sufficient structural strength, and tends to collapse too soon after leaving the spraying apparatus. The visibility of the deposit on the target during spraying is also reduced, thereby making it more difficult to obtain a uniform coverage of the target area.

Below about 15% by weight of alkali metal silicate the dried foams are quite fragile and tend to fall apart easily. Above about 15% alkali metal silicate the dried foams are strong enough to maintain their integrity even under the action of wind and other light physical forces; therefore, this is the preferred lower limit for the foams of the invention. The addition of sodium methylsiliconate or xanthan gum increases the strength of the foams and improves their resistance to water. With these additives foams containing 5 to 15% alkali metal silicate can be made which, when dry, remain in place several days or even weeks.

In these foams stabilized with xanthan gum or sodium methyl siliconate where the minimum amount of alkali metal silicate is used, the water content of the foams can approach about 95% by weight. Aqueous solutions containing more than about 50% alkali metal silicate are very difficult to make. Since a surfactant and a pesticide must also be present with the alkali metal silicate in the foams of the invention, the upper limit for sodium silicate content obtainable from commercially available silicate solutions is about 45%, using potassium silicate commercial solutions, the upper silicate content is about 40%. Similarly, using lithium silicate, the upper silicate content is about 22%.

The silica to alkali metal oxide mole ratio of the alkali metal silicates can vary from about 1.8:1 to 20:1, depending on which of the alkali metal silicates is used. Commercially available grades of sodium silicate with silica to sodium oxide ratios of 1.9:1 to 3.5:1, or potassium silicate with silica to potassium oxide ratios of 1.8:1 to 2.5:1, and lithium silicate with silica to lithia ratios of 4.8:1 to 10:1 are particularly suitable as foam stabilizers. Lithium silicates with even higher ratios of $SiO_2$ to $Li_2O$ up to about 20:1 can be made and are useful where very low levels of alkali are desired in treating sensitive plants. The alkali metal silicates can be used as the commercially available concentrated solutions, or as these solutions diluted to lower silicate content. The lower ratio silicates which are readily soluble in the dry form can be used as such or can even be blended with the pesticide, the surfactant and other ingredients in dry form to provide a very convenient dry mixture which can be used directly by merely adding to water and mixing gently, e.g., with a paddle.

From the standpoint of availability and economy, sodium silicate is the preferred stabilizer for the pesticide foams of the invention. Sodium silicate foams are particularly advantageous when the foam is to be applied to undesirable plant species. However, when the foams are applied to desirable plant species, such as crops or ornamental shrubs or lawns, for example as a selective herbicide or as an insecticide or fungicide, the high sodium content or the high pH of the foams may result in damage to certain valuable plants. In these special cases, silicates having less harmful cations such as potassium, which is a plant nutrient, or foams containing a mixture of sodium and potassium silicates may be preferable. The high ratio lithium silicate foams are particularly useful where low alkalinity is desirable.

The surfactant used in the present invention functions as a foaming agent and can be either anionic, cationic, or nonionic. The following are typical of the foaming agents which can be used in preparing foams of this invention:

Anionic

Sodium alkylnaphthalene sulfonate
Sodium alkyl aryl sulfonate
Sodium lauryl ether sulfate
Sodium dodecyl diphenyl ether disulfonate
Triethanolamine alkyl aryl sulfonate
Sodium ethoxylated lauryl sulphate Cationic N(lauryl colamino formyl methyl)pyridinium chloride
N-alkyl trimethylammonium chloride
bis(2-hydroxyethyl)octadecylamine oxide
Dimethyl hexadecylamine oxide
Alkyl dimethyl benzylammonium chloride
Oleyl dimethylamine oxide Nonionic Octyl phenoxy polyethoxy ethanol
Tridecyloxypoly(ethyleneoxy)ethanol
Dodecyl phenyl polyethylene glycol ether
Alkyl phenoxy polyoxyethylene ethanol
Polyoxyethylene thioether
Lauric isopropanolamide Additional examples can be found in the annual publication of John W. McCutcheon, Inc., entitled "Detergents and Emulsifiers." Those surfactant compositions that have antifoaming action are obviously excluded. The minimum surfactant content of the foam is 0.5 percent by weight of the alkali metal silicate present. Below about 0.5 percent the mixture is difficult to foam and the increase in volume of the foam over the liquid used to create it is not of sufficient magnitude to merit its use instead of water. Surfactant in excess of about 10 percent by weight of the alkali metal silicate present is generally superfluous and costly, inasmuch as this excess does not appear to impart to the foam any desirable properties beyond that obtained at the 10 percent surfactant level. However, it has been found by various investigators that additional amounts of surfactant, beyond that required for good wetting, enhance the activity of some foliar pesticides. In some cases, using water as the carrier, the weight ratio of surfactant to pesticide in the spray tank has amounted to as much as 7.5:1. Although for the foams of the present invention an amount of surfactant in excess of about 10 percent by weight of the alkali metal silicate present does not significantly alter the foam properties beyond those obtained at the 10 percent level, considerably greater amounts can be added if such excess is found to enhance the activity of the pesticide.

Sodium methyl siliconate can be added optionally to the foam solution in amounts up to 10 percent by weight of the alkali metal silicate present. Up to about the 10 percent level, the sodium methyl siliconate imparts to the foam an increased measure of stability, thereby slowing down the rate at which the foam collapses to a liquid. The desired collapse rate may differ, depending upon the particular pesticide being applied and the specific target being treated. At about the 10 percent level and above, the sodium methyl siliconate has a deleterious effect in that it causes partial gelling of the alkali metal silicate before the solution is foamed. At considerably greater than the 10 percent level, the sodium methyl siliconate can prevent foam generation altogether.

Xanthan gum, a high molecular weight linear polysaccharide can also be added optionally to the foam solution in amounts up to 1.5% by weight of the total water present. Xanthan gum is soluble in water and increases the viscosity, thereby retarding or preventing collapse of the foam structure during drainage. The resulting foams dry to tougher, more coherent structures than when the xanthan gum is not present. Above 1.5% by weight of xanthan gum, the viscosity of the foaming solution is so high that it becomes difficult to make foams.

The foam can contain from 0.1 to 25 percent by weight of either a soluble or suspendable pesticide. The lower limit is set to include those chemicals which are very effective in accomplishing their intended purposes at extremely low concentration levels, such as some insecticides and insect attractants. In other cases, it may be necessary to include as much as 25 percent by weight of the pesticide in the foam in order to obtain the desired level of control of the target pest.

In some cases, as with some of the commonly available wettable powder formulations of pesticides, the active chemical may amount to only 50 percent or less of the formulated commodity, the remainder being dispersants, surfactants, and inert diluents. In many cases the diluents are readily suspended in the foam and do not adversely affect its fluidity or stability; but the high level of inert diluents, present in some formulations, may load the solution so heavily with insoluble particulate matter that foaming is impossible, or the foams are unstable and collapse too soon. To avoid these situations the proviso is added that there must be present in the foam-pesticide mixture a minimum of 40 percent by weight of water.

It should also be noted that certain pesticides will not be stable in the more highly alkaline foaming solutions, such as those containing the lower ratio alkali metal silicates and therefore cannot be used in this manner if they degrade to chemicals that are ineffective in accomplishing their intended purposes. In some cases, for example in certain amine salts, the amine may be displaced by the alkali metal cation of the silicate but the resulting composition may still be an effective pesticide. Those skilled in the art will be able to readily determine which formulations of pesticides available on the market are suitable for use in an alkaline medium.

The pesticides listed above and specifically mentioned in the examples are not intended as an exhaustive catalog of pesticides to be used with the aqueous alkali metal silicate foams of this invention. Any pesticide compatible with the other components of the foam may be used as disclosed herein.

The foams of the invention have a foam expansion factor between 3 and 300. Foams with low expansion factors give the least advantage in terms of reducing the amount of liquid required to apply a pesticide. High expansion foams are very low in density and are consequently more subject to drift. They do not adhere as well to the target, and they are more fragile when dry, thus they are more readily removed by the action of wind and water. The best balance of foam stability, density, strength and adhesion is obtained when the foam expansion factor is between 10 and 100, and this is the preferred range for the foams of the invention.

The foams of the present invention can be generated by any of several processes familiar in the art, the essential feature being that the foaming solution is mixed or agitated in such a manner that air is captured by the liquid to form bubbles.

A suitable generator is described by H. J. Braud in "Generation of Agricultural Foam" (Paper 69–617 presented at the 1969 Winter Meeting of the American Society of Agricultural Engineers). It consists of a pyramidally or conically shaped mixing chamber wherein the base is covered with from 2 to 10 screens (about 40 mesh) arranged in series. The foaming solution is sprayed from near the apex of the chamber onto the screens, uniformly wetting them. A low velocity air current is passed through the screen section cocurrently with the solution at a rate of 0.3 to 1 ft./sec. The pressure requirement is of the order of 1.5 inches of water column per screen.

Another technique for generating foam is described by J. F. Fry and R. J. French in "A Mechanical Foam-Generator for Use in Laboratories," J. Appl. Chem., 1, 425–29, October 1951. In this system a single supply line provides compressed air at 100 p.s.i. for pressurizing the foaming liquid and for mixing air with the liquid at the mixing chamber. Air and the pressurized liquid are metered separately into the mixing chamber via directly opposed nozzles which are operated at one predetermined pressure by adjusting appropriately positioned reducing valves. Foam leaving the mixing chamber passes through a short length of pipe containing a series of gauze disks which serve to distribute the air more uniformly in the liquid and avoid the discharge of unmixed air. The foam is then discharged through a length of rubber hose fitted with a nozzle.

Another foaming technique used in the present invention consists of pumping the foaming solution containing the pesticide by means of a non-pulsating positive displacement pump into the bottom of a vertical section of pipe packed with stainless steel wool and having an outlet at the top through which the foam emerges. Concurrently, air at about 70 p.s.i.g. is admitted at the bottom of the pipe and is subsequently distributed throughout the liquid by the steel wool packing as it passes upward in the tube, resulting in the formation of a foam. A generator used to make the aqueous alkali metal silicate foams of the invention, and to incorporate pesticides therein, is described in Example 1. In order to assure a uniform distribution of the pesticide in the foaming solution, the following preparation procedure is observed.

(1) In cases where the selected foam composition includes the addition of water, mix the pesticide (or dissolve, if water-soluble) in the water component and mix this with the predetermined amount of alkali metal silicate solution. Continue stirring until distribution of the pesticide is uniform.

If the alkali metal silicate solution is to be used undiluted, slowly add the pesticide or a concentrated aqueous slurry of the pesticide to the silicate solution as the latter is being vigorously stirred, for example with a Waring Blendor, and continue stirring until uniformity is attained.

(2) If foam statbilizers such as sodium methyl siliconate and xanthan gum are to be used, they may be added slowly at this point. Care should be exercised to avoid the formation of froth on the liquid. Alternatively, the foam stabilizer can be added to the water before the addition of pesticide, and this is preferable in the case of xanthan gum which does not readily dissolve in concentrated solutions of alkali metal silicate.

(3) Finally, add the surfactant slowly while carefully stirring the mixture.

When all of the ingredients are homogeneously blended, the mixture is ready to be admitted into the foam generator. The foaming liquid should be gently agitated in the supply tank at all times in order to maintain a uniform mixture. Of course, air agitation is not suitable for this operation.

The foam that emerges from the generator can be applied either as droplets or as a continuous layer. One method for distributing the foam in a continuous layer or band is described in Example 3. The method consists essentially of feeding the foam as it comes from the generator into a chamber equipped with a narrow slot. The chamber can be attached to the rear of a tractor such that it is pulled close to the ground with the slot running parallel to the ground surface. As the tractor moves, the foam that emerges from the slot forms a continuous band having a cross-section approximately equal in size and shape to the slot itself. A number of these slotted chambers can be arranged for simultaneous multiple-row band application on field crops.

The generator described previously, wherein the foam is produced by passing air and foaming solution concurrently through a series of screens covering the base of a conically or pyramidally shaped chamber provides an excellent means for laying down a continuous layer or band of foam. Illustrations of this are given in the paper by H. J. Braud cited earlier.

The method proposed in the present invention for applying the foam in the form of droplets consists essentially of introducing the foam as a steady stream into an air blast which serves to break the foam stream up and to propel the droplets to the target. For multiple row application of the foam spray on field crops a satisfactory system is that produced by the John Blue Co. of Huntsville, Ala., Models S700 and S702. The system is best described in U.S. Pat. 3,472,454. A portable system suitable for hand application of the foam on trees and brush is the Solo Knapsack Mistblower, Models 423 and 410, available from Solo Motors, Inc. of Newport News, Va. The foam can be fed from the generator by means of a flexible tube through the liquid-input port of the mistblower into the high velocity air current created by the mistblower. The air current breaks the foam stream into droplets and propels them a distance of 10 feet or more to the target. Another satisfactory device for applying the foams of the invention as droplets consists of a nozzle through which the foam and compressed air emerge cocurrently. A portion of the air is diverted such that it impinges on the foam stream from two opposing directions, causing the foam droplets to diverge and form a spray pattern. Nozzles of the type suitable for this purpose are available from Binks Manufacturing Co., Chicago, Ill., consisting of, for example, air cap No. 69PA in conjunction with fluid nozzle No. 68. These nozzles can be adapted for hand spraying or multiple-row crop spraying.

This invention will be better understood by reference to the following illustrative examples, wherein percentages and parts are by weight, unless otherwise noted.

EXAMPLE 1

One thousand twenty-five parts of a wettable powder formulation containing 80% bromacil (5 - bromo - 3 - sec-butyl - 6 - methyluracil) is mixed thoroughly with 1400 parts of water. Stirring is continued while 780 parts of a sodium silicate solution containing 37.9% sodium silicate and having a silica to sodium oxide ratio of 3.25:1 is poured into the mixture. After sufficient stirring to assure a uniform mixture of the above-mentioned constituents, 90 parts of a 30% aqueous solution of sodium methyl siliconate is added, followed by 95 parts of a 28% aqueous solution of sodium alkyl aryl sulfonate, an anionic surfactant, and stirring is continued gently, to avoid forming a froth.

The entire mixture is then poured into the supply tank of the continuous foam generator and gently agitated while it is being fed into the generator to maintain the pesticide in uniform suspension.

The foam generator consists of a section of U.S. Standard 2", Schedule 40 galvanized steel pipe, 47 inches (120 cm.) long capped on each end with a 2 x ½" spot reducing collar. About 40 inches of the length of the section of pipe is firmly packed with coarse stainless steel wool. The mixture charged to the supply tank is admitted through one leg of a ½ SPT T connected by a nipple to the reducing collar at one end of the pipe section. The solution is pumped by a positive displacement type CDQ, frame 6N1, form UN "Moyno" pump, manufactured by Robbins & Meyers, Inc., Springfield, Ohio. The pump discharge rate is accurately determined by pump speed and is constant at a given pump speed at discharge pressures up to about 450 p.s.i.g. The other leg of the ½ SPT T is connected through a needle valve and diaphragm-type pressure regulator to a supply of compressed air at about 100 p.s.i.g. An air flow meter, conveniently a rotameter, is inserted in the air supply line between the regulator and the needle valve. The discharge end of the foam generator is connected through appropriate pipe and rubber hose or tubing to the discharge nozzle for purposes of distributing the foam.

In this instance, the "Moyno" pump is operated at 72 r.p.m. and air at 70 p.s.i.g. is fed through the needle valve at a rate of 3000 cc./min. The resulting foam is fine-bubbled and has an expansion factor of about 50. It is fed by means of a flexible tube through the liquid-input port of a Solo Mistblower Model 410 (Solo Motors, Inc., Newport News, Va.) into the rapidly moving air stream created by the mistblower. The air stream breaks the foam into discrete foam droplets ranging from about ⅛" in diameter to about ½" diameter and propels them to the target.

When sprayed from the Solo Mistblower at the rate of 11 kilos of active per hectare along a railroad right-of-way, excellent control of grasses and broadleaf weed species, such as quack grass (*Agrophyron repens*), cheat (*Bromus secalinus*), foxtail (*Setaria viridis*), dandelion (*Taraxacum officinale*), and lambsquarter (*Chenopodium album*) is observed less than one week after application and persists throughout the growing season.

The highly visible foam droplets permit complete and uniform coverage of the target foliage and prevent wasteful overlapping of foliage already treated. The amount of liquid spray solution to be transported is approximately one-fiftieth that required when using water as carrier.

EXAMPLE 2

This is an example of the use of lithium silicate foam as a carrier of an agricultural fungicide. One hundred parts of a wettable powder formulation containing 54% methyl 2-benzimidazolecarbamate is slurried with 400 parts of water. The slurry is then mixed uniformly with 9000 parts of "Polysilicate 85," a lithium silicate solution supplied by E. I. du Pont de Nemours and Company containing 21.2% by weight of lithium silicate and having a silica to lithium oxide mole ratio of 8.5:1. To this mixture is then added 15 parts of sodium isopropylnaphthalene sulfonate anionic surfactant. The mixture is foamed, the foam having an expansion factor of about 10, and distributed in the manner of Example 1.

When sprayed from the Solo Mistblower of Example 1 onto apple trees in sufficient quantity to essentially spot all of the leaves with the foam, excellent control of apple scab (*Venturia inaequalis*) is obtained. The applied foam is highly visible, thus facilitating uniform application and greatly reducing the likelihood of wasteful overapplication of the pesticide. It adheres tenaciously to the trees and is resistant to washoff.

EXAMPLE 3

This is an example of the use of a sodium silicate foam stabilized with xanthan gum and used as a carrier for an insect attractant and an insecticide in combination. Twenty parts of Kelzan®, a xanthan gum supplied by the Kelco Co. of Clark, N.J., which is a linear polysaccharide having a molecular weight greater than a million, is dissolved in 1000 parts of water. Twenty parts of a wettable powder formulation containing 50% methoxychlor [2,2-bis(p-methoxyphenyl) - 1,1,1 - trichloroethane], is slurried with the solution of xanthan gum and to the slurry is added 4000 parts of a sodium silicate solution containing 43.50% sodium silicate, and having a silica to sodium oxide ratio of 1.90 to 1. One hundred parts of a 90% aqueous solution of trimethyl nonylpolyethylene glycol ether, a nonionic surfactant, is then added, exercising care to obtain a uniform mixture of the ingredients without causing the solution to froth. To this mixture is added two parts of a Japanese beetle attractant consisting of 9 parts phenethylbutyrate and 1 part eugenol. Blending is continued until a uniform mixture is obtained. The mixture is foamed in the manner of Example 1. The resulting foam, having an expansion factor of about 50, is fed directly from the generator through a flexible tube to a small closed end stainless steel cylinder (2" diameter x 3.5" long, wall thickness 1/16") containing an adjustable slot along its entire length parallel to the longitudinal axis. The slot is adjusted to allow the foam to emerge from it in the form of a band about 4" wide and ½" thick. Bands are laid between every fifth and sixth row of sweet corn and the foam dries with slight shrinkage, retaining its structure for several days after application and exhibiting remarkable resistance to degradation from adverse weather conditions, such as dust, wind and rain.

These bands of foam are extremely effective in attracting and killing Japanese beetles (*Popilla japonica*).

EXAMPLE 4

Four hundred parts of a wettable powder formulation containing 80% terbacil (3-tert-butyl-5-chloro-6-methyluracil) is mixed as in Example 1 with 2000 parts of water, 2000 parts of the sodium silicate of Example 1, and 100 parts of a 50% aqueous solution of N-alkyltrimethylammonium chloride cationic surfactant. The mixture is foamed in the manner of Example 1, except that the air flow to the foam generator is increased to 9000 cc./min., resulting in a fine-bubbled foam with an expansion factor of about 150. The foam is fed through flexible tubing to Binks air-liquid cocurrent spray nozzles attached to a boom. When applied in the spring as a band over rows of fall-planted sugar cane at the rate of 2 pounds of active per crop acre, excellent control of Johnson grass seedlings (*Sorghum halepense*), barnyard grass (*Echinochloa crus-galli*), teaweed (*Sida spinosa*), morning glory (*Ipomoea hederacea*), and crabgrass (*Digitaria sanguinalis*) is obtained. The amount of liquid spray solution to be transported is approximately one-twentieth that required when using water as a carrier.

EXAMPLE 5

This is an example of the use of a foam stabilized with a mixture of potassium and sodium silicate as a carrier for an agricultural soil fungicide. One thousand parts of a wettable powder formulation containing 65% chloroneb (1,4-dichloro-2,5-dimethoxybenzene) is slurried with 3000 parts of water. Stirring is continued with the addition of 2350 parts of a solution consisting of 1550 parts of potassium silicate, containing 38.7% solids and having a silica to potassium oxide mole ratio of 2.1:1 (E. I. du Pont de Nemours & Co., Grade 865) and 800 parts of sodium silicate, containing 37.9% solids and having a silica to sodium oxide mole ratio of 3.25:1 (E. I. du Pont de Nemours & Co., Type 9). After sufficient stirring to assure a uniform mixture of the above mentioned constituents, 150 parts of a 30% aqueous solution of sodium methyl siliconate is added, followed by 200 parts of a 28% aqueous solution of sodium alkyl aryl sulfonate, an anionic surfactant, and stirring is continued gently, to avoid forming a froth. The mixture is foamed in the manner of Example 1 and the resulting foam having an expansion factor of about 10, is applied by the procedure of Example 3, as a uniform band about 2" wide and ½" thick, directly over cotton seeds in a furrow, just prior to closing the furrow with covering soil, known to be infested with the Rhizoctonia and Pythium species. The chloroneb is applied at the rate of about 2 pounds per acre; alternate furrows are left untreated. Excellent stands of cotton are obtained with the plants grown from seed covered with the foam band, whereas in the untreated furrows, many of the seedlings did not emerge, and others were seriously damaged by soreshin after emergence. The very uniform stands observed in the treated rows are an indication of the accuracy and uniformity of placement of the soil fungicide in the form of a foam band.

We claim:

1. An aqueous foam composition comprising a minimum of 40 percent by weight water, from 0.1 to 25 percent by weight of a pesticide suitable for use in an alkaline medium, from 5 to 50 percent by weight of at least one alkali metal silicate selected from the group consisting of sodium silicate having a silica to sodium oxide mole ratio from about 1.9 to 1 to 3.5 to 1, potassium silicate having a silica to potassium oxide mole ratio of 1.8 to 1 to 2.5 to 1, and lithium silicate having a silica to lithium oxide mole ratio of 4.8 to 1 to 10 to 1, 0 to 1.5 percent by weight xanthan gum based on the water in the foam, 0 to 10% by weight sodium methyl siliconate based on alkali metal silicate in the foam and 0.5 to 10 percent by weight of a surfactant foaming agent based on alkali metal silicate in the foam, the foam having a total volume between 3 and 300 times the volume of water in the foam.

EXAMPLE 5

2. The foam composition of claim 1 having a total volume between 10 and 100 times the volume of water in the foam.

3. The foam composition of claim 2 containing from 5 to 45 percent by weight of sodium silicate.

4. The foam composition of claim 2 containing from 5 to 40 percent by weight of potassium silicate.

5. The foam composition of claim 2 containing from 5 to 22 percent by weight of lithium silicate.

References Cited

UNITED STATES PATENTS

| | | | |
|---|---|---|---|
| 2,916,855 | 12/1959 | Thiegs | 252—307 X |
| 3,136,645 | 6/1964 | Dess | 106—75 |
| 2,797,141 | 6/1957 | Veatch | 252—307 X |
| 3,194,730 | 7/1965 | Nemec et al. | 424—357 X |
| 3,475,375 | 10/1969 | Yates | 260—59 |

OTHER REFERENCES

Chemical Abstracts, 27:3295[7] (1933).

ALBERT T. MEYERS, Primary Examiner

L. SCHENKMAN, Assistant Examiner

U.S. Cl. X.R.

71—67, 79, DIG 1; 424—213, 218, 219, 224, 274, 278, 287, 289, 295, 300, 303, 308, 341, 352, 354, 357